(12) United States Patent
Kaneko et al.

(10) Patent No.: US 8,076,008 B2
(45) Date of Patent: Dec. 13, 2011

(54) GALVANIZED HIGH STRENGTH STEEL SHEET

(75) Inventors: Shinjiro Kaneko, Tokyo (JP); Hiroshi Matsuda, Tokyo (JP); Yoshiyasu Kawasaki, Tokyo (JP); Tatsuya Nakagaito, Tokyo (JP); Yoshitsugu Suzuki, Tokyo (JP); Yusuke Fushiwaki, Tokyo (JP); Takashi Kawano, Tokyo (JP); Saiji Matsuoka, Tokyo (JP)

(73) Assignee: JFE Steel Corporation (JP)

( * ) Notice: Subject to any disclaimer, the term of this patent is extended or adjusted under 35 U.S.C. 154(b) by 169 days.

(21) Appl. No.: 12/594,018

(22) PCT Filed: Mar. 27, 2008

(86) PCT No.: PCT/JP2008/056623
§ 371 (c)(1),
(2), (4) Date: Nov. 20, 2009

(87) PCT Pub. No.: WO2008/123561
PCT Pub. Date: Oct. 16, 2008

(65) Prior Publication Data
US 2010/0112377 A1    May 6, 2010

(30) Foreign Application Priority Data

Mar. 30, 2007 (JP) ................................. 2007-093947
Jan. 11, 2008 (JP) ................................. 2008-005008

(51) Int. Cl.
B32B 15/01 (2006.01)
B32B 15/04 (2006.01)
B32B 15/18 (2006.01)
B32B 15/20 (2006.01)

(52) U.S. Cl. .................... 428/659; 428/681; 428/684

(58) Field of Classification Search .................. 428/658, 428/659, 681, 684, 685
See application file for complete search history.

(56) References Cited

U.S. PATENT DOCUMENTS

| 6,342,310 B2 | 1/2002 | Hashimoto et al. |
| 6,743,307 B1 | 6/2004 | Engl et al. |
| 2001/0031377 A1 | 10/2001 | Hashimoto et al. |

FOREIGN PATENT DOCUMENTS

| JP | 5-195084 A | 9/1993 |
| JP | 5-271894 A | 10/1993 |
| JP | 5-331537 A | 12/1993 |
| JP | 6-093340 A | 4/1994 |
| JP | 6-108152 A | 4/1994 |
| JP | 1853389 C | 7/1994 |
| JP | 7-011383 A | 1/1995 |
| JP | 10-060593 A | 3/1998 |
| JP | 2761095 B2 | 6/1998 |
| JP | 2761096 B2 | 6/1998 |
| JP | 2862186 B2 | 2/1999 |
| JP | 2862187 B2 | 2/1999 |
| JP | 11-061327 A | 3/1999 |
| JP | 2001-288550 A | 10/2001 |
| JP | 2002-047535 A | 2/2002 |
| JP | 2003-505604 T | 2/2003 |
| JP | 2003-213369 * | 7/2003 |
| JP | 2003-213369 A | 7/2003 |
| JP | 2003-213370 A | 7/2003 |
| JP | 3459500 B2 | 10/2003 |
| JP | 2004-115843 A | 4/2004 |
| JP | 3527092 B2 | 5/2004 |
| JP | 3610883 B2 | 1/2005 |
| JP | 2005-264323 * | 9/2005 |
| JP | 2005-264323 A | 9/2005 |
| JP | 2007-302918 A | 11/2007 |

OTHER PUBLICATIONS

Machine Translation, Yoshida et al., JP 2005-264323, Sep. 2005.*
Machine Translation, Kameda et al., JP 2003-213369, Jul. 2003.*

* cited by examiner

*Primary Examiner* — Michael Lavilla
(74) *Attorney, Agent, or Firm* — DLA Piper LLP (US)

(57) ABSTRACT

A high-strength galvanized steel sheet is provided which has a tensile strength of a level of about 590 MPa and superior formability, including a coating with good appearance. The galvanized steel sheet includes a base steel and a galvanized coating layer formed over the surface of the base steel. The galvanized steel sheet has a chemical composition containing 0.005% to 0.12% of C, 0.7% to 2.7% of Si, 0.5% to 2.8% of Mn, 0.1% or less of P, 0.07% or less of S, 1.0% or less of Al, 0.008% or less of N, and the balance being Fe and inevitable impurities on a mass basis, and a microstructure constituted of at least 90% of ferrite and 2% to 10% of martensite on an area basis. The ferrite has a Vickers hardness of 120 or more on average, and an inclusion is precipitated from the grain boundary with a length of 50% or less relative to the entire length of the grain boundary in the surface layer of the base steel with a depth of 3 μm from the interface between the coating layer and the base steel.

20 Claims, No Drawings

GALVANIZED HIGH STRENGTH STEEL SHEET

RELATED APPLICATIONS

This is a §371 of International Application No. PCT/JP2008/056623, with an international filing date of Mar. 27, 2008 (WO 2008/123561 A1, published Oct. 16, 2008), which is based on Japanese Patent Application No. 2007-093947, filed Mar. 30, 2007, and 2008-005008, filed Jan. 11, 2008.

TECHNICAL FIELD

This disclosure relates to a high-strength galvanized steel sheet used in the fields of automotive industry and electrical industry, having superior formability and including a coating with good appearance. Galvanized steel sheets and galvannealed steel sheets having an alloyed coating layer are generically called the galvanized steel sheet.

BACKGROUND

In view of global environmental protection, it is an important task today, for example, to increase automobile fuel efficiency. Accordingly, it is actively attempted to reduce the weight of the automotive body by strengthening the body material so that the thickness can be reduced. However, strengthening of steel sheet reduces the formability. A material having both high strength and high formability is desired.

Accordingly, a variety of multi phase steel sheets have been developed, such as ferrite-martensite dual phase steel (so-called dual phase steel) and so-called TRIP steel using the transformation induced plasticity of retained austenite. For example, Japanese Patent No. 1853389 discloses a high-strength steel sheet with low yield ratio superior in surface quality and bendability, produced under specific conditions of chemical composition, hot rolling, and annealing, and a method for manufacturing the same.

PCT Japanese Translation Patent Publication No. 2003-505604 discloses a method for manufacturing a high-strength steel sheet having superior mechanical properties by specifying the chemical composition, the amount of martensite, and the manufacturing process. Japanese Patent No. 3610883 discloses a method for manufacturing a steel sheet having a superior bendability by hot-rolling and annealing a steel having a specifying composition under specific conditions. Japanese Unexamined Patent Application Publication No. 11-61327 discloses a method for manufacturing a steel sheet giving crash safety to automobiles and having superior formability by specifying the volume fraction of martensitic phase and the martensite grain diameter and mechanical properties.

In addition, Japanese Unexamined Patent Application Publication No. 10-60593 discloses a steel sheet having superior stretch flangeability in which the chemical composition and phase structure and the hardness ratio of the phases are specified. Japanese Unexamined Patent Application Publication No. 7-11383 discloses a steel sheet exhibiting superior fatigue characteristics in which the chemical composition and phase structure, and the grain diameter and hardness ratio of the phases are specified.

The above-cited steel sheets may be galvanized to form a zinc coating to improve the corrosion resistance in practical use. In this instance, to ensure press formability, spot weldability, and paint adhesion, galvannealing is often applied in which the zinc coating is heat-treated to diffuse the Fe of the steel sheet into the coating. Following this trend, a variety of steel sheets are being developed.

For example, Japanese Patent No. 3527092 makes a proposal for galvanized steel sheet, and discloses that high-strength galvannealed steel sheet is improved in ductility and formability by specifying the chemical composition and the amount of retained austenite. Also, Japanese Unexamined Patent Application Publication No. 2003-213369 proposes a high-strength steel sheet, a high-strength galvanized steel sheet, and a high-strength galvannealed steel sheet produced by specifying the composition and the volume fraction and grain diameter of martensitic phase, and thus exhibiting superior stretch flangeability and crash resistance. Japanese Unexamined Patent Application Publication No. 2003-213370 proposes a high-strength steel sheet, a high-strength galvanized steel sheet, and a high-strength galvannealed steel sheet produced by specifying the chemical composition, the ferrite grain diameter and microstructure, and the volume fraction of martensitic phase, and thus exhibiting superior stretch flangeability, shape fixability, and crash resistance.

Japanese Patent Nos. 2862186, 2862187, 2761095 and 2761096 propose methods for manufacturing a steel sheet superior in ductility, stretch flangeability, and bendability by heat-treating a steel having a predetermined composition under specific conditions in a continuous galvanizing line. Japanese Unexamined Patent Application Publications Nos. 6-93340 and 6-108152 propose high-strength galvanized steel sheets whose stretch flangeability and bendability are improved by specifying the chemical composition and conditions of the galvanizing line, and methods and apparatuses for manufacturing the high-strength galvanized steel sheet.

Furthermore, Japanese Unexamined Patent Application Publication No. 2004-115843 proposes a steel sheet superior in shape fixability, coating adhesion, and ductility in view of wettability and quality of coating, produced by specifying the chemical composition, the amount of martensite, and the Fe content in the coating. Japanese Unexamined Patent Application Publication No. 2002-47535 proposes a steel sheet superior in ductility, flaking, and powdering, produced by specifying the chemical composition, the amount of retained austenite, and the Fe and Al contents in the coating.

Japanese Unexamined Patent Application Publication No. 2001-288550 proposes that, for a high Si, high Mn steel to ensure good appearance of the coating, a galvanized steel sheet without an uncoated portion be produced by controlling the high Si—Mn layer formed in the vicinity of the interface between the coating and the base steel to an appropriate state. Japanese Patent No. 3459500 proposes that a high-strength galvannealed steel sheet superior in form ability and coating adhesion be produced by specifying the chemical composition and the process conditions.

Unfortunately, the above known art has the following problems. For example, Japanese Patent No. 1853389 discloses that annealing is performed in a single phase region, followed by cooling to 400° C. at a rate of 6 to 20° C./s. However, the manufacture of a galvanized steel sheet requires taking coating adhesion into consideration. In addition, since cooling to 400° C. is performed to a temperature lower than or equal to the hot dip zinc pot temperature, the temperature must be increased before galvanization. It is thus difficult to manufacture a galvanized steel sheet in a continuous galvanizing line (CGL), which does not have any heating device upstream from the hot dip zinc pot.

PCT Japanese Translation Patent Publication No. 2003-505604, Japanese Patent No. 3610883, Japanese Unexamined Patent Application Publication Nos. 11-61327 and 7-11383, Japanese Patent No. 3527092 and Japanese Unexamined Patent Application Publication No. 2003-213370 do not consider stretch flangeability, and do not produce stable coating adhesion or stretch flangeability particularly when galvanization is applied. Japanese Unexamined Patent Application Publication No. 10-60593 proposes that the phase structure is turned into ferrite and bainite or pearlite to ensure a sufficient stretch flangeability. This technique however does not produce sufficient ductility. In Japanese Unexamined Patent Application Publication No. 2003-213369, the stretch flangeability and the crash resistance are enhanced by specifying the chemical composition and the martensite grain diameter and volume fraction. However, when a ferrite-martensite multi-phase structure is particularly galvanized, satisfying stretch flangeability cannot be produced stably.

Japanese Patent No. 2862186 produces superior ductility, but does not consider stretch flangeability or bendability. In contrast, Japanese Patent Nos. 2862187 and 2761095 produce superior stretch flangeability and bendability, but do not consider ductility. Japanese Patent No. 2761096 is intended to enhance the ductility and results in insufficient stretch flangeability, and is applied to only a limited portion. Japanese Unexamined Patent Application Publication Nos. 6-93340 and 6-108152 require that the martensite be produced by annealing during heat treatment in the galvanizing line, and accordingly require an apparatus for reheating after cooling to the Ms temperature or less.

Japanese Unexamined Patent Application Publication Nos. 2004-115843 and 2002-47535 can ensure wettability and coating adhesion, but do not consider stretch flangeability. In particular, in galvanization, coating adhesion or stretch flangeability is not stably exhibited. Japanese Unexamined Patent Application Publication No. 2001-288550 exhibits good appearance of the coating when a Si—Mn layer is formed at the grain boundary neat the interface, but does not sufficiently ensure mechanical properties. Mechanical properties are also significantly varied disadvantageously. Japanese Patent No. 3459500 proposes a steel sheet superior in formability and coating adhesion produced with a specific chemical composition under specific conditions. However, steel sheet superior in formability is not necessarily produced only by specifying the chemical composition and manufacturing conditions, and exhibits large variation in characteristics.

Accordingly, it could be helpful to overcome the above-described problems and to provide a high-strength galvanized steel sheet having a tensile strength of a level of about 590 MPa, including a coating with good appearance, and exhibiting superior formability.

SUMMARY

We thus provide:

(1) A high-strength galvanized steel sheet including a base steel and a galvanized coating layer formed over the surface of the base steel, the galvanized steel sheet having a chemical composition containing on a mass basis:
0.005% to 0.12% of C;
0.7% to 2.7% of Si;
0.5% to 2.8% of Mn;
0.1% or less of P;
0.07% or less of S;
1.0% or less of Al;
0.008% or less of N; and
the balance being Fe and inevitable impurities, and a microstructure constituted of at least 90% of ferrite and 2% to 10% of martensite on an area basis, wherein the ferrite has a Vickers hardness of 120 of more on average, and an inclusion is precipitated from the grain boundary with a length of 50% or less relative to the entire length of the grain boundary in the surface layer of the base steel with a depth of 3 μm from the interface between the coating layer and the base steel.

The inclusion is constituted of an element contained in the steel and refers to a precipitated oxide, carbide, or nitride in a state of non-solid solution. More specifically, the inclusion is an oxide containing at least one element selected from the group consisting of Si, Mn, P, Al, REM's, Cr, V, Ti, Nb, B, and Ca, or a carbide or nitride containing at least one element selected from the group consisting of Cr, V, Mo, Ti, Nb, B, and Ca.

(2) The high-strength galvanized steel sheet of (1), wherein the martensite has a grain diameter of 5 μm or less, and an average grain spacing of 2 μm or more.

(3) The high-strength galvanized steel sheet of (1) or (2), wherein the microstructure includes at least $3.3 \times 10^{-3}$ secondary phases per $\mu m^2$ existing in the inner ferrite grains.

The secondary phases existing in the inner ferrite grains are constituted of martensite or a carbide.

(4) The high-strength galvanized steel sheet of (1), (2), or (3), wherein the inclusion precipitated at the grain boundary in the surface layer of the base steel has a length of 0.3 μm or less on average along the grain boundary.

(5) The high-strength galvanized steel sheet of any one of (1) to (4), wherein the chemical composition further contains at least one selected from among:
0.05% to 1.2% of Cr;
0.005% to 1.0% of V; and
0.005% to 0.5% of Mo, on a mass basis.

(6) The high-strength galvanized steel sheet of any one of (1) to (5), wherein the chemical composition further contains at least one selected from among:
0.01% to 0.1% of Ti;
0.01% to 0.1% of Nb;
0.0003% to 0.0050% of B;
0.05% to 2.0% of Ni; and
0.05% to 2.0% of Cu, on a mass basis.

(7) The high-strength galvanized steel sheet of any one of (1) to (6), wherein the chemical composition further contains at least one of:
0.001% to 0.005% of Ca; and
0.001% to 0.005% of REM, on a mass basis.

(8) The high-strength galvanized steel sheet of any one of (1) to (7), wherein the iron content in the coating layer is in the range of 7% to 15% by mass.

We provide a high-strength galvanized steel sheet having superior formability, including a coating with good appearance. The high-strength galvanized steel sheet has high industrial applicability, and is particularly useful for weight reduction and corrosion prevention of automotive bodies, thus being industrially advantageous.

DETAILED DESCRIPTION

To produce a high-strength galvanized steel sheet superior in ductility and stretch flangeability, we conducted intensive research on the microstructure and chemical composition of steel sheet, and the steel sheet distribution of inclusions in the vicinity of the coating. As a result, a steel sheet not only having superior ductility and including a coating with good appearance, but also ensuring a sufficient stretch flangeability has been achieved even for dual-phase steel constituted of untempered martensite and ferrite, in which stretch flangeability is generally difficult to ensure, by controlling the area ratio of ferrite to the secondary phases and their hardnesses, and optimizing the distribution state and the size of inclusion such as an oxide formed on the surface of the steel sheet in the vicinity of the interface with the coating.

Our steel sheets and methods will now be described in detail.

In general, a dual-phase structure constituted of ferrite and untempered hard martensite can ensure a sufficient ductility, but does not exhibit a sufficient stretch flangeability due to a large difference in hardness between the ferric phase and the martensitic phase. Accordingly, a stretch flangeability is ensured by using ferrite as the primary phase and carbon-containing bainite or pearlite as the hard secondary phase to reduce the difference in hardness. However, this does not produce sufficient ductility. To ensure ductility and stretch flangeability in a structure including secondary phases formed of martensite or retained austenite (including bainite containing retained austenite), it is studied that, for example, the secondary phase structure is formed of a mixed phase structure of martensite and bainite. However, to give the secondary phase a variety of phase-mixed structure and to control the volume fractions of the phases precisely, the conditions of the heating treatment must be strictly controlled, and accordingly some problems often occur in the manufacturing stability or the like.

We studied the relationship among the difference in hardness, the volume fractions, and the mechanical properties of the phases, and beside changes and improvement in characteristics after galvanization. In particular, we studied the possibility of enhancing the characteristics of a dual phase steel constituted of ferrite and untempered martensite, which can be most stably manufactured without use of special equipment for heat treatment in the galvanizing line.

As a result, we found as for the relationship between the phase structure and the mechanical properties of the steel sheet that the ductility and the stretch flangeability are increased without reducing the strength by solid solution strengthening of the ferrite and greatly increasing the volume fraction of the ferrite, and that the hardness ratio between the ferrite and the martensite is reduced to increase the stretch flangeability by solid solution strengthening of the ferrite. Thus, the microstructure of the base steel is determined. Sufficient stretch flangeability is ensured by using the ability of ferrite for solid solution strengthening and optimizing the volume fraction, the grain diameter, and the dispersion of the martensitic phase, and that the stretch flangeability is further enhanced by producing a microstructure preventing voids from joining together.

To ensure a sufficient stretch flangeability, the hardness ratio is reduced without reducing the strength by increasing the volume fraction of solid solution-strengthened ferrite to 90% or more. Also, by reducing the grain diameter of martensite to 5 μm or less to reduce the amount of the interface between the martensite and the ferrite, from which a void occurs, thus increasing the average grain spacing of the martensite to 2 μm or more, a crack resulting from coalescence of voids can be prevented from occurring and propagating. In addition, by increasing the amount of martensitic phases existing in the inner ferrite grains, a crack resulting from coalescence of voids can be prevented from occurring and propagating and the hardness ratio of martensite to ferrite (martensite hardness/ferrite hardness) can be reduced.

In addition, we found that galvanization of steel sheet having the above-described structure may widely vary the stretch flangeability and does not necessarily produce a stable stretch flangeability. Accordingly, we conducted intensive research on the cause of the variation in stretch flangeability in galvanization.

As a result, we found that when an inclusion such as internal oxide is produced at the surface of the steel sheet to ensure wettability, the distribution of the inclusion (mainly Si- or Mn-based oxide) present at the interface between the coating layer and the steel sheet affects the stretch flangeability, and that a sufficient stretch flangeability can be stably ensured by reducing the amount of such an inclusion at the grain boundary of the steel sheet surface. More specifically, by controlling the length of the grain boundary from which the inclusion is precipitated to 50% or less relative to the entire length of the grain boundary of the phase structure of the base steel constituted of, for example, a ferritic phase and a martensitic phase in the surface layer of the base steel right under the coating layer, that is, in the base steel surface layer with a depth of 3 μm from the interface between the coating layer and the base steel, a superior stretch flangeability can be reliably produced.

Furthermore, by setting the length of the inclusion along the grain boundary, precipitated from the base steel surface layer to the grain boundary to 0.3 μm or less on average, superior stretch flangeability can be more stably ensured. This is notable in use of a dual phase steel constituted of ferrite and untempered martensite.

This is probably because in the steel sheet that is constituted of ferrite and untempered martensite, which is a harder secondary phase than annealed martensite, bainite, or pearlite, voids are much easily formed in the surface layer of the steel sheet during shearing or stretch flanging after shearing.

As described above, the stretch flangeability of a dual phase steel sheet constituted of ferrite and untempered martensite, which generally cannot easily ensure stretch flangeability, is enhanced by largely increasing the volume fraction of the ferritic phase to alleviate a negative effect on the stretch flangeability resulting from the difference in hardness between the ferritic phase and the secondary phases, and that superior, stable stretch flangeability is ensured in the dual phase steel sheet without variation by optimizing the microstructure of the steel sheet in the vicinity of the interface with the coating layer. Also, the strength is enhanced even by solid solution strengthening of the ferritic phase to reduce the volume fraction of the hard secondary phases. Furthermore, ductility is ensured by making the most of the superior formability of the ferritic phase.

Ranges specified for the microstructure and the reasons will be described below.

Ferritic Phase Area Ratio: 90% or More

When the secondary phase is constituted of hard untempered martensite, the area of the ferritic phase is set to 90% or more to ensure a sufficient stretch flangeability.

Average Vickers Hardness (HV) of Ferritic Phase: 120 or More

To ensure a sufficient strength, and a sufficient stretch flangeability when the secondary phase is constituted of hard untempered martensite, the HV value of the ferritic phase must be 120 or more, and preferably 140 or more.

Martensitic Phase Area Ratio: 2% to 10%

Although the hard secondary phase may contain bainite in addition to martensite, at least 2% of martensite must be contained from the viewpoint of ensuring a sufficient strength and promoting the work hardening of ferrite. In addition, the area of the ferritic phase must be 90% or more to ensure a sufficient stretch flangeability, as described above, and the area of the martensitic phase is 10% or less accordingly.

Ratio of the Length of the Grain Boundary from Which an Inclusion is Precipitated to the Entire Length of the Grain Boundary in the Base Steel Surface Layer with a Depth of 3 μm from the Interface Between the Coating Layer and the Base Steel Sheet: 50% or Less To ensure a sufficient stretch flangeability stably, the ratio of the length of the grain boundary from which an inclusion is precipitated to the entire length of the grain boundary in the base steel surface layer is required to be 50% or less, and preferably 30% or less.

The principal micro structure is as above, and the characteristics can be further improved by specifying the micro structure as below.

Martensite Grain Diameter: 5 μm or Less

To reduce the interface between the ferritic phase and the martensitic phase, from which voids are produced, and thus to ensure a satisfying stretch flangeability, the martensite grain diameter is preferably 5 μm or less.

Average Grain Spacing of Martensite: 2 μm or More

To prevent a crack from being produced by voids coalescence and from being propagated, and thus to ensure a satisfying stretch flangeability, the average grain spacing of martensite is preferably 2 μm or more.

Number of Secondary Phases Existing in the Inner Ferrite Grains: at Least $3.3 \times 10^{-3}$ Per $\mu m^2$ To ensure a sufficient strength, and prevent a crack from being produced by voids coalescence and from being propagated to ensure a satisfying stretch flangeability, the number of secondary phases existing in the inner ferrite grains is preferably at least $3.3 \times 10^{-3}$ per $\mu m^2$. In this instance, the secondary phases are preferably constituted of martensite from the viewpoint of reducing the hardness to ensure a satisfying stretch flangeability. The secondary phases are in a state of block, plate, or bar.

Length of Inclusion Along the Grain Boundary, Precipitated from the Base Steel Surface Layer to the Grain Boundary: 0.3 μm or Less To ensure a sufficient stretch flangeability stably, it is necessary to specify the length of the inclusion precipitated to the grain boundary from the base steel surface right under the coating layer. In addition, by setting the length of each inclusion along the grain boundary to 0.3 μm or less on average, a sufficient stretch flangeability can be reliably ensured. This is probably because, but not necessarily clear, a small grain diameter of the inclusion reduces the occurrence of voids.

The chemical composition of the steel sheet, and the reason why the chemical composition is specified will now be described. "%" of the composition of the steel sheet represents "% by mass" unless otherwise specified.

C: 0.005% to 0.12%

C is an element indispensable in enhancing the strength of the steel sheet. A steel sheet containing less than 0.005% of C does not easily ensure a sufficient strength or satisfy desired characteristics. In contrast, a C content of more than 0.12% not only leads to difficulty in ensuring a ferritic phase volume fraction of 90% or more, but also causes the weld and heat-affected zone to be significantly hardened to degrade the weldability. Accordingly, the C content is set in the range of 0.005% to 0.12%. To ensure a sufficient ferritic phase volume fraction stably, the C content is preferably less than 0.08%, and more preferably less than 0.04%.

Si: 0.7% to 2.7%

Si is an element to produce ferrite and is useful for solid solution strengthening of ferrite. The Si content is required to be 0.7% or more from the viewpoint of ensuring a sufficient ductility and a sufficient hardness of the ferrite. However, excessive addition of Si causes red scales or the like to degrade the surface quality and the coating adhesion. Thus, the Si content is set in the range of 0.7 to 2.7%, and preferably more than 0.9%.

Mn: 0.5% to 2.8%

Mn is an element useful in strengthening steel and stabilizing austenite, and necessary for adjusting the volume fraction of the secondary phases. Accordingly, 0.5% or more of Mn is required. In contrast, however, an excessive addition of more than 2.8% increases the volume fraction of the secondary phases and thus leads to difficulty in ensuring a sufficient volume fraction of ferritic phase. Accordingly, the Mn content is in the range of 0.5% to 2.8%, and preferably 1.6% or more.

P: 0.1% or less

Although P is an element useful in strengthening steel, an excessive addition of more than 0.1% of P causes the grain boundary to segregate. Consequently, the steel is embrittled to degrade the crash resistance. In addition, a P content of more than 0.1% extremely reduces the alloying speed. Accordingly, the P content is 0.1% or less.

S: 0.07% or less

Since S turns into MnS or other inclusions to degrade the crash resistance or cause a crack along the metal flow of the weld, the S content should be as low as possible. The S content is set to 0.07% or less, in view of the manufacturing cost Al: 1.0% or less Although Al is an element to produce ferrite and is useful in controlling the formation of ferrite in manufacture, an excessive addition of Al degrades the quality of slab in steelmaking. Accordingly, the Al content is set to 1.0% or less, and preferably 0.5% or less.

N: 0.008% or less

N is an element to most degrade the aging resistance of the steel, and accordingly the lower the N content, the better. A N content of particularly more than 0.008% leads to a significant degradation in aging resistance. Accordingly, the N content is set 0.008% or less.

The steel sheet is mainly composed of the above listed principal constituents and iron. The words "mainly composed of" means that the steel sheet may contain inevitable impurities and other elements capable of enhancing the functions of those elements instead of impairment of the functions, and improving the mechanical and chemical characteristics. For example, the steel sheet may contain at least one of the elements Cr, V, and Mo, as follows:

Cr: 0.05% to 1.2%; V: 0.005% to 1.0%; Mo: 0.005% to 0.5%.

Since Cr, V, and Mo can prevent the formation of pearlite during cooling from the annealing temperature, they may be added as needed. The effect of these elements can be produced when the Cr content is 0.05% or more, the V content is 0.005 or more, or the Mo content is 0.005% or more. However, if the Cr content is more than 1.2%, the V content is more than 1.0%, or the Mo content is more than 0.5%, the volume fraction of the secondary phase becomes excessive. Accordingly, the strength may be seriously increased. Thus, these elements, if added, are controlled to a Cr content of 1.2% or less, a V content of 1.0% or less, and a Mo content of 0.5% or less.

In addition, the steel sheet may contain at least one of the elements Ti, Nb, B, Ni, and Cu, as follows:

Ti: 0.01% to 0.1%; and Nb: 0.01% to 0.1%.

Ti and Nb are useful for precipitation strengthening of steel, and the effect is produced in Ti and Nb contents of at least 0.01% each. Ti and Nb can be used in the above-specified range to strengthen the steel. However, a Ti or Nb content of more than 0.1% leads to degraded formability and shape fixability. Accordingly, the Ti and the Nb content, if added, are set in the range of 0.01% to 0.1% and in the range of 0.01% to 0.1%, respectively.

B: 0.0003% to 0.0050%

B can prevent ferrite from being produced from austenite grain boundary and growing, and may be added if necessary. The effect is produced in a B content of 0.0003% or more. If the B content is more than 0.0050%, the formability is degraded. Accordingly, the B content, if added, is set in the range of 0.0003% to 0.0050%.

Ni: 0.05% to 2.0%, Cu: 0.05% to 2.0%

Ni and Cu are elements useful in strengthening steel, and can be used in the above-specified range to strengthening the steel. Also, they promote internal oxidation to increase the coating adhesion. This effect can be produced in their contents of at least 0.05% each. However, contents of more than 2.0% cause the formability of the steel sheet to be degraded. Accordingly, the Ni and Cu contents, if added, are each set in the range of 0.05% to 2.0%.

Ca: 0.001% to 0.005%, REM: 0.001% to 0.005%

Ca and REM's are useful in spheroidizing sulfides to alleviate the negative effect of sulfides on the stretch flangeability. This effect is produced in their contents of at least 0.001% each. However, their excessive addition increases inclusions and causes a defect at the surface or inside. Accordingly, the Ca and the REM content, if added, are set in the range of 0.001% to 0.005% each.

One of our methods for manufacturing the high-strength galvanized steel sheet will now be described.

A steel sheet having the above-described composition is heated to a temperature range of 600° C. or more at a rate of 5° C./s or more.

If the heating temperature is less than 600° C., or if the heating rate is less than 5° C./s, austenitic phases are not finely or uniformly dispersed. Consequently, the martensitic phases in the resulting microstructure are not finely or uniformly dispersed. This is undesirable from the viewpoint of enhancing the stretch flangeability.

Then, annealing is performed for 15 to 600 seconds in a first temperature range of 700 to 940° C., more specifically, in a temperature range in which an austenitic single phase or two phases of austenite and ferrite are exist. If the annealing temperature is less than 700° C., or if the annealing time is less than 15 seconds, desired characteristics may not be produced because carbides in the steel sheet are not sufficiently melted or recrystallization of ferrite is not completed. In contrast, if the annealing temperature is more than 940° C., austenite grains grow extremely and may reduce ferrite nucleation sites produced by cooling. Annealing performed for more than 600 seconds consumes a great deal of energy to increase cost. Accordingly, the annealing temperature is set in the range of 700 to 940° C., and the annealing time is set in the range of 15 to 600 seconds. The annealing temperature is preferably 820° C. or more from the viewpoint of ensuring a satisfying stretch flangeability.

After annealing, cooling is performed to a temperature of 550° C. at a rate in the range of 3 to 60° C./s, and subsequently galvanization is performed within 200 seconds. If the cooling rate is less than 3° C./s, pearlite or the like can be formed and an intended microstructure may not be produced.

If the cooling rate is more than 60° C./s, ferrite transformation does not sufficiently occur and a microstructure constituted of a ferrite base in which the secondary phases are finely and uniformly dispersed is not easily produced. This is undesirable from the viewpoint of enhancing the stretch flangeability.

If the period of time at 550° C. before immersing a hot dip zinc pot is beyond 200 seconds, bainite transformation or the like proceeds and an intended microstructure may not be produced.

The temperature at which cooling is suspended is preferably in the range of 450 to 500° C. Consequently, the stretch flangeability can further be enhanced because the amount of ferrite is increased, that is, the area ratio and the grain diameter of martensite are reduced, during cooling, and because the average grain spacing of martensite is increased.

Galvanization is performed by immersing a steel sheet in a hot dip zinc pot of 450 to 500° C. containing 0.12% to 0.22% of dissolved Al for manufacturing a galvanized (GI) steel sheet, or 0.08% to 0.18% of dissolved Al for galvannealed (GA) steel sheet. The amount of coating is controlled by gas wiping. The temperature of the hot dip zinc pot for galvanization can be generally in the range of 450 to 500° C. The steel sheet may further galvannealed preferably at a temperature of 600° C. or less. This is because a carbide is precipitated (or may be turned into pearlite) from untransformed austenite at temperatures of more than 600° C. Consequently, an intended microstructure cannot be produced, and the ductility is degraded. In addition, powdering characteristics are degraded. Galvannealing does not progress at 450° C. or less.

In the sequence of heat treatment, the temperature is not necessarily held constant as long as it is in the above-specified range. Also, the cooling rate may be varied without departing from the scope and spirit of the method as long as it is in the specified range. In addition, the steel sheet may be heat-treated in any apparatus as long as the thermal history satisfies requirements. Furthermore, the steel sheet after heat treatment may be subjected to temper rolling for shape correction.

Although our method assumes that the manufacturing process includes normal steps of steelmaking, casting, and hot-rolling, part or the entirety of the hot-rolling step may be omitted by, for example, thin casting.

To introduce an inclusion such as an oxide into the surface layer of the base steel to ensure a sufficient wettability, the oxygen potential of the steel sheet surface layer may be increased in the annealing step so that the base steel surface layer is internally oxidized. For example, the surface of a steel sheet is oxidized at a high temperature to deposit a sufficient amount of Fe scales by setting the temperature of the discharging side of the heating zone in the CGL having a DFF-type or NOF-type heating zone to 600° C. or more. Consequently, the Fe scales act as the source of oxygen in the reducing zone, thereby internally oxidizing the surface of the steel sheet. Alternatively, the dew point of the heating zone or the reducing zone, which is generally in the range of −60 to −20° C., may be increased to a temperature in the range of −20 to +20° C. An Fe pre-coating containing oxygen may be formed on the surface of a cold-rolled steel sheet to increase the oxygen potential of the steel sheet during recrystallization annealing. The same effect can be produced by previous internal oxidation of the steel sheet surface performed by taking up a hot-rolled steel sheet on which black scales are deposited at an increased temperature or additionally heat-treating a hot-rolled steel sheet, in a preceding-step of cold rolling.

Thus, easily oxidized elements, such as Si, Mn, Al, and P, are fixed as oxides, so that Si, Mn, Al, P, and the like can be prevented from being concentrated at the surface after annealing. Consequently, satisfying wettability can be ensured. In addition, the solid solutions of these elements, which delay galvannealing, are reduced, and accordingly the characteristics of the galvannealed coating are improved, including the coating adhesion.

Furthermore, the ratio of the length of the grain boundary from which the inclusion is precipitated to the entire length of the grain boundary in the base steel surface layer with a depth of 3 μm from the interface between the coating layer and the base steel is controlled to 50% or less. If this ratio is more than 50%, a fracture occurs from the surface layer in the manufacturing process to degrade the stretch flangeability and the stability of the stretch flangeability. The reason why the surface layer of the base steel is defined as the region with a depth of 3 μm from the interface between the coating layer and the base steel is that the occurrence of a fracture from the surface layer of the steel sheet during stretch flanging, which degrades the stretch flangeability and affects the variation in stretch flangeability, depends on the state of the grain boundary in the surface region with a depth of 3 μm. If a large amount of inclusion is present in this region, the occurrence of fracture is seriously increased to degrade the stretch flangeability. Furthermore, by setting the length of the inclusions along the grain boundary, precipitated at the grain boundary in the surface layer of the base steel to 0.3 μm or less on average, superior stretch flangeability can be more stably ensured.

The formation of inclusion in the surface layer of the base steel can be examined by observing a sample of steel sheet whose section is mirror-polished by SEM (scanning electron microscopy), or observing the section of a thin sample formed by FIB (focused ion beam) by TEM (transmission electron microscopy). The inclusions can be identified by, for example, SEM-EDS (energy dispersive X-ray analysis), EPMA (electron probe micro analysis), or FE-AES (field emission Auger electron spectroscopy) of a section-polished sample. For more detailed analysis, the replica of a thin sample or section-polished sample may be subjected to TEM-EDS.

The proportion of the grain boundary including a precipitate and affecting the stretch flangeability can be evaluated by measuring the length of the crystallized grain boundary and the length of the precipitate at the grain boundary using an image of the section observed by SEM or TEM. In this instance, image processing, such as binarization, may also be performed effectively according to the circumstances. The length of the precipitate along the grain boundary can also be measured using an image of the section observed by SEM or TEM.

To increase the precision, it is important to measure many points in either observation. For SEM observation for example, preferably, randomly selected five or more fields of view and randomly selected ten or more analyzing points are measured at a magnification of ×5000 and the average of these measured points are used for the evaluation.

The amount of coating is set to 20 to 150 g/m² for each surface. A coating of less than 20 g/m² leads to degraded corrosion resistance. A coating of more than 150 g/m² leads to increased cost and saturates the effect of corrosion resistance.

For galvannealing the galvanized coating, the Fe content in coating is set in the range of 7% to 15%. If the iron content in the coating layer is less than 7%, uneven galvannealing occurs to degrade the appearance, or a so-called ξ phase is produced to degrade the friction properties. In contrast, an iron content of more than 15% produces a large amount of hard, brittle F phase to degrade the coating adhesion.

In the above-described manufacturing method, the steel sheet may be heat-treated with any apparatus.

EXAMPLES

Our steel sheets and methods will further be described in detail with reference to Examples. The Examples are not intended to limit this disclosure, and various modifications may be made without departing from the scope and spirit of the disclosure.

Example 1

Cast strands prepared from steels having chemical compositions shown in Table 1 were hot-rolled, followed by pickling. Each hot-rolled steel was then cold-rolled into a 1.2 mm thick cold-rolled steel sheet. Then, the gas air ratio in the DFF (direct fired furnace) of a continuous galvanizing line was controlled to 1.0 to 1.2 upstream, and to 0.9 downstream. Also, the temperature of the DFF is appropriately changed to heat for heat treatment of austenitic single phase or two-phase region. Subsequently, galvanization was performed in a galvanization hot dip zinc pot of 463° C. so as to form a coating of about 40 to 60 g/m² for each surface, followed by galvannealing so that the percentage of Fe in the coating layer would be about 10% by mass. For controlling the Fe content in coating, the line speed or the galvannealing temperature was appropriately changed. The resulting steel sheet was 0.3% temper-rolled.

TABLE 1

| Steel type | Chemical composition (mass %) | | | | | | | | | | | | | | | | | Remark |
|---|---|---|---|---|---|---|---|---|---|---|---|---|---|---|---|---|---|---|
| | C | Si | Mn | Al | P | S | N | Ni | Cu | Cr | V | Mo | Ti | Nb | B | Ca | REM | |
| A | 0.010 | 1.49 | 2.51 | 0.040 | 0.011 | 0.005 | 0.039 | — | — | — | — | — | — | — | — | — | — | Conforming steel |
| B | 0.028 | 1.01 | 2.49 | 0.036 | 0.012 | 0.004 | 0.023 | — | — | — | — | — | — | — | — | — | — | Conforming steel |
| C | 0.025 | 1.51 | 2.02 | 0.041 | 0.012 | 0.004 | 0.029 | — | — | — | — | — | — | — | — | — | — | Conforming steel |
| D | 0.031 | 2.02 | 1.84 | 0.042 | 0.015 | 0.005 | 0.040 | — | — | — | — | — | — | — | — | — | — | Conforming steel |
| E | 0.032 | 2.01 | 2.04 | 0.039 | 0.009 | 0.004 | 0.037 | — | — | — | — | — | — | — | — | — | — | Conforming steel |
| F | 0.030 | 2.52 | 2.04 | 0.040 | 0.025 | 0.002 | 0.038 | — | — | — | — | — | — | — | — | — | — | Conforming steel |
| G | 0.049 | 1.50 | 1.62 | 0.041 | 0.010 | 0.004 | 0.037 | — | — | — | — | — | — | — | — | — | — | Conforming steel |
| H | 0.051 | 1.46 | 2.01 | 0.040 | 0.010 | 0.003 | 0.041 | — | — | — | — | — | — | — | — | — | — | Conforming steel |
| I | 0.078 | 1.50 | 1.80 | 0.039 | 0.013 | 0.004 | 0.032 | — | — | — | — | — | — | — | — | — | — | Conforming steel |
| J | 0.102 | 1.00 | 1.62 | 0.037 | 0.012 | 0.003 | 0.033 | — | — | — | — | — | — | — | — | — | — | Conforming steel |
| K | 0.125 | 0.75 | 1.81 | 0.041 | 0.010 | 0.003 | 0.039 | — | — | — | — | — | — | — | — | — | — | Comparative steel |
| L | 0.091 | 0.28 | 1.87 | 0.037 | 0.029 | 0.003 | 0.041 | — | — | 0.20 | 0.05 | — | — | — | — | — | — | Comparative steel |
| M | 0.145 | 0.48 | 1.40 | 0.037 | 0.029 | 0.003 | 0.041 | — | — | — | — | — | — | — | — | — | — | Comparative steel |
| N | 0.031 | 1.00 | 2.19 | 0.043 | 0.013 | 0.002 | 0.043 | — | — | 0.21 | — | — | — | — | — | — | — | Conforming steel |
| O | 0.030 | 0.99 | 2.20 | 0.039 | 0.013 | 0.003 | 0.037 | — | — | 0.39 | — | — | — | — | — | — | — | Conforming steel |
| P | 0.031 | 0.79 | 2.25 | 0.038 | 0.012 | 0.003 | 0.041 | — | — | 0.42 | — | — | — | — | — | — | — | Conforming steel |
| Q | 0.030 | 1.50 | 2.00 | 0.040 | 0.013 | 0.003 | 0.041 | — | — | 0.20 | — | — | — | — | — | — | — | Conforming steel |
| R | 0.031 | 0.98 | 2.10 | 0.041 | 0.011 | 0.004 | 0.029 | 0.60 | 0.30 | 0.20 | — | — | — | — | — | — | — | Conforming steel |
| S | 0.028 | 1.49 | 2.01 | 0.037 | 0.013 | 0.002 | 0.040 | 1.00 | 0.51 | — | — | — | — | — | — | — | — | Conforming steel |
| T | 0.029 | 1.51 | 1.99 | 0.044 | 0.009 | 0.004 | 0.031 | — | — | 0.12 | 0.05 | — | — | — | — | — | — | Conforming steel |
| U | 0.033 | 0.99 | 2.10 | 0.042 | 0.011 | 0.003 | 0.040 | — | — | — | — | 0.11 | — | — | — | — | — | Conforming steel |

TABLE 1-continued

| Steel type | Chemical composition (mass %) | | | | | | | | | | | | | | | | Remark |
|---|---|---|---|---|---|---|---|---|---|---|---|---|---|---|---|---|---|
| | C | Si | Mn | Al | P | S | N | Ni | Cu | Cr | V | Mo | Ti | Nb | B | Ca | REM | |
| V | 0.011 | 1.50 | 2.48 | 0.037 | 0.013 | 0.004 | 0.036 | — | — | — | — | — | 0.025 | 0.020 | 0.0010 | — | — | Conforming steel |
| W | 0.033 | 1.02 | 2.03 | 0.039 | 0.031 | 0.004 | 0.037 | — | — | — | — | — | 0.023 | — | 0.0010 | — | — | Conforming steel |
| X | 0.030 | 1.00 | 2.02 | 0.040 | 0.012 | 0.005 | 0.040 | — | — | — | — | — | 0.026 | 0.021 | 0.0011 | — | — | Conforming steel |
| Y | 0.025 | 1.51 | 2.02 | 0.041 | 0.012 | 0.004 | 0.035 | — | — | — | — | — | — | — | — | 0.003 | — | Conforming steel |
| Z | 0.030 | 1.50 | 2.00 | 0.042 | 0.010 | 0.004 | 0.039 | — | — | 0.20 | — | — | — | — | — | — | 0.002 | Conforming steel |

Underlined value: outside the scope of this disclosure

The sectional microstructure (at a plane parallel to the rolling direction) of the resulting galvanized steel sheet was observed in 10 fields of view through a scanning electron microscope (SEM) at a magnification of ×2000, and the area ratio Vα of ferritic phase and the area ratio VM of martensitic phase were measured, thereby identifying the phase structure of the respective crystal grains. To distinguish martensite from retained austenite, a sample subjected to heat treatment at 200° C. for 2 hours and a sample of the product were prepared for observing the microstructure. The heat treatment at 200° C. for 2 hours produces carbides from only martensite without varying the volume fraction of each phase, thereby distinguishing the martensite from retained austenite. It was confirmed that other changes did not occur, by comparison with the sample of the product.

The hardness HVα of the ferritic phase was measured with an ultra micro Vickers hardness meter at a load of 1 gf and a loading time of 15 s. The indentation measurement was performed by measuring a profile in the depth direction through a 3D SEM. Five points were measured and the average was used as the HVα value.

Tensile test was performed on JIS No. 5 specimens prepared from the steel sheet in accordance with JIS Z 2241. The tensile strength (TS) and the total elongation (T. El) were measured and a value representing the tensile strength-elongation balance expressed by a product of the strength and the elongation (TS×T. El) was calculated. When TS×T. El≧17000 (MPa·%) holds, the balance is determined to be good.

The stretch flangeability was evaluated in accordance with the Japan Iron and Steel Federation Standard JFST 1001. The produced steel sheet was cut into pieced of 100 mm by 100 mm and a hole of 10 mm in diameter was punched at a clearance of 12%. Then, a 60° conical punch was pressed into the hole and the diameter of the hole at a crack initiation limit was measured with a die of 75 mm in inner diameter pressing the sample at a blank holding force of 9 tons. The hole expanding limit (%) was calculated from the following equation, and the stretch flangeability evaluated from the resulting hole expanding limit. When TS×λ≧41300 (MPa·%) holds, the stretch flangeability is determined to be good.

Hole expanding limit $\lambda(\%) = \{(D_f - D_o)/D_o\} \times 100$ where $D_f$: hole diameter at crack initiation (mm); $D_o$: initial hole diameter (mm).

For evaluation of the state of inclusion and the amount of solid solution in the surface layer of the base steel, a specimen of a section of the interface between the coating layer and the base steel was prepared by mirror-polishing a specimen of the steel sheet at a section perpendicular to the rolling direction. For the length ratio of the inclusion to the grain boundary, backscattered electron images of the above specimen were taken in five fields of view in the vicinity of the interface between the coating layer and the base steel through an SEM at a magnification of ×5000. The length of the crystal grain boundary observed in each backscattered electron image, within the region with a depth of 3 μm of the base steel sheet, and the length of each inclusion occupying over the grain boundary were measured, and the ratio of their lengths was calculated using the average of the lengths in five fields of view.

The lengths of inclusions in the grain boundary were measured as the lengths of the respective precipitates along the grain boundary observed in the SEM images, and were averaged.

Table 2 shows the evaluation results together. According to visual inspection of the appearance of the coating, any appearance of the coatings was good except specimen No. 37. The Fe content in coating of specimen No. 37 did not reach a desired range and uneven appearance was pronounced. Thus, the appearance of the coating was not good. The coating adhesion was evaluated by delamination behavior when the galvanized steel sheet was simply bent 90°. The delamination of specimen No. 38 was pronounced and the coating adhesion was bad. The coating adhesions of the other steel sheets were good. As is clear from the results above, steel sheets satisfying the requirements are superior in strength-elongation balance and strength-stretch flangeability balance, exhibiting desired characteristics.

TABLE 2

| No | Steel Type | Sheet temperature in DFF (° C.) | Annealing temperature (° C.) | Vα (%) | VM (%) | HVα | Ratio of the length of grain boundary from which inclusion is precipitated to the entire length of grain boundary (%) | Average length of inclusion along grain boundary (mm) | Coating type |
|---|---|---|---|---|---|---|---|---|---|
| 1 | A | 765 | 850 | 95.4 | 4.6 | 182.5 | 15 | 0.28 | GA |
| 2 | A | 750 | 820 | 95.1 | 4.9 | 179.8 | 44 | 0.26 | GI |

TABLE 2-continued

| No | | | | | | | | |
|---|---|---|---|---|---|---|---|---|
| 3 | B | 720 | 850 | 91.0 | 9.0 | 157.4 | 37 | 0.22 | GI |
| 4 | B | 710 | 880 | 91.7 | 8.3 | 155.2 | 13 | 0.13 | GA |
| 5 | C | 755 | 820 | 94.0 | 6.0 | 161.5 | 22 | 0.18 | GA |
| 6 | D | 780 | 880 | 93.5 | 6.2 | 171.8 | 13 | 0.16 | GA |
| 7 | D | 770 | 850 | 92.4 | 7.0 | 172.4 | 39 | 0.18 | GI |
| 8 | E | 790 | 880 | 94.7 | 5.3 | 178.3 | 9 | 0.29 | GA |
| 9 | E | 760 | 850 | 93.5 | 6.5 | 179.1 | 23 | 0.29 | GA |
| 10 | F | 790 | 880 | 93.0 | 7.0 | 181.0 | 23 | 0.20 | GA |
| 11 | G | 765 | 880 | 91.0 | 7.0 | 148.0 | 48 | 0.22 | GA |
| 12 | G | 775 | 850 | 90.5 | 7.5 | 148.5 | 36 | 0.27 | GA |
| 13 | G | 770 | 820 | 90.2 | 8.2 | 145.1 | 35 | 0.25 | GA |
| 14 | H | 780 | 820 | 89.0 | 10.0 | 165.1 | 45 | 0.33 | GA |
| 15 | I | 775 | 850 | 90.4 | 9.6 | 147.9 | 42 | 0.28 | GA |
| 16 | J | 725 | 860 | 90.1 | 9.9 | 137.0 | 28 | 0.20 | GA |
| 17 | K | 720 | 850 | 87.8 | 10.7 | 132.0 | 43 | 0.32 | GA |
| 18 | L | 640 | 830 | 86.2 | 11.7 | 118.5 | 11 | 0.09 | GA |
| 19 | M | 670 | 820 | 85.3 | 8.4 | 135.0 | 14 | 0.11 | GA |
| 20 | N | 710 | 850 | 92.5 | 7.5 | 150.8 | 26 | 0.20 | GA |
| 21 | N | 790 | 820 | 92.2 | 7.8 | 151.3 | 54 | 0.51 | GA |
| 22 | O | 680 | 850 | 92.5 | 7.5 | 152.3 | 21 | 0.08 | GA |
| 23 | O | 670 | 820 | 92.3 | 7.7 | 154.1 | 16 | 0.15 | GI |
| 24 | P | 670 | 820 | 93.1 | 6.9 | 148.2 | 21 | 0.10 | GI |
| 25 | Q | 745 | 850 | 93.2 | 6.8 | 164.3 | 29 | 0.12 | GA |
| 26 | R | 720 | 840 | 91.7 | 8.3 | 149.2 | 24 | 0.27 | GA |
| 27 | S | 775 | 820 | 92.0 | 8.0 | 162.0 | 23 | 0.18 | GA |
| 28 | T | 755 | 840 | 92.7 | 7.3 | 162.5 | 28 | 0.21 | GA |
| 29 | U | 720 | 850 | 91.2 | 8.8 | 149.3 | 25 | 0.20 | GA |
| 30 | V | 755 | 850 | 93.2 | 6.8 | 181.2 | 21 | 0.19 | GA |
| 31 | V | 760 | 880 | 93.8 | 6.2 | 182.2 | 23 | 0.21 | GA |
| 32 | W | 770 | 820 | 91.2 | 8.8 | 156.9 | 11 | 0.18 | GA |
| 33 | X | 775 | 850 | 90.2 | 9.8 | 159.3 | 8 | 0.09 | GA |
| 34 | X | 765 | 880 | 90.9 | 9.1 | 157.5 | 19 | 0.12 | GA |
| 35 | Y | 750 | 830 | 93.7 | 6.3 | 160.5 | 25 | 0.22 | GA |
| 36 | Z | 740 | 840 | 93.3 | 6.7 | 161.4 | 31 | 0.25 | GA |
| 37 | A | 580 | 840 | 95.0 | 6.0 | 179.7 | 11 | 0.05 | GA |
| 38 | A | 765 | 820 | 95.2 | 4.8 | 180.1 | 14 | 0.24 | GA |

| No | Amount of coating (g/m$^2$) | Fe in coating layer (mass %) | TS (MPa) | El (%) | λ (%) | TS × El (MPa %) | TS × λ (MPa %) | Remark |
|---|---|---|---|---|---|---|---|---|
| 1 | 48 | 9.5 | 602.0 | 31.3 | 108 | 18843 | 65016 | Example |
| 2 | 61 | — | 601.9 | 31.3 | 107 | 18839 | 64403 | Example |
| 3 | 62 | — | 617.0 | 30.4 | 87 | 18757 | 53679 | Example |
| 4 | 36 | 8.8 | 597.4 | 30.5 | 91 | 18221 | 54363 | Example |
| 5 | 46 | 9.2 | 607.0 | 32.7 | 83 | 19849 | 50381 | Example |
| 6 | 62 | 10.2 | 611.3 | 33.7 | 95 | 20601 | 58074 | Example |
| 7 | 48 | — | 619.3 | 33.1 | 94 | 20499 | 58214 | Example |
| 8 | 48 | 10.5 | 646.5 | 31.9 | 106 | 20623 | 68529 | Example |
| 9 | 47 | 9.8 | 657.8 | 30.9 | 75 | 20326 | 49335 | Example |
| 10 | 47 | 10.3 | 668.4 | 30.6 | 82 | 20453 | 54809 | Example |
| 11 | 51 | 9.7 | 592.9 | 34.2 | 74 | 20277 | 43875 | Example |
| 12 | 47 | 8.9 | 601.7 | 33.4 | 74 | 20097 | 44526 | Example |
| 13 | 35 | 9.0 | 609.2 | 32.3 | 73 | 19677 | 44472 | Example |
| 14 | 46 | 9.8 | 691.2 | 29.1 | 52 | 20114 | 35942 | Comparative example |
| 15 | 46 | 9.5 | 645.0 | 29.5 | 69 | 19028 | 44505 | Example |
| 16 | 48 | 9.7 | 652.0 | 28.0 | 67 | 18256 | 43684 | Example |
| 17 | 46 | 9.8 | 621.0 | 29.4 | 48 | 18257 | 29808 | Comparative example |
| 18 | 48 | 10.1 | 617.3 | 28.9 | 47 | 17840 | 29013 | Comparative example |
| 19 | 47 | 10.3 | 591.0 | 26.4 | 45 | 15602 | 26595 | Comparative example |
| 20 | 61 | 9.2 | 602.0 | 32.1 | 81 | 19324 | 48762 | Example |
| 21 | 48 | 10.2 | 632.8 | 30.2 | 64 | 19111 | 40499 | Comparative example |
| 22 | 47 | 8.7 | 613.6 | 31.1 | 82 | 19083 | 50315 | Example |
| 23 | 48 | — | 635.7 | 30.0 | 83 | 19071 | 52763 | Example |
| 24 | 47 | — | 612.0 | 31.2 | 84 | 19094 | 51408 | Example |
| 25 | 48 | 10.1 | 633.0 | 31.5 | 85 | 19940 | 53805 | Example |
| 26 | 48 | 9.5 | 623.0 | 31.7 | 85 | 19749 | 52955 | Example |
| 27 | 47 | 9.3 | 645.0 | 30.8 | 88 | 19866 | 56760 | Example |
| 28 | 48 | 10.2 | 617.0 | 31.7 | 84 | 19559 | 51828 | Example |
| 29 | 61 | 9.3 | 609.5 | 31.5 | 82 | 19199 | 49979 | Example |
| 30 | 37 | 10.8 | 606.0 | 31.6 | 118 | 19150 | 71508 | Example |
| 31 | 46 | 9.5 | 605.0 | 30.6 | 135 | 18513 | 81675 | Example |
| 32 | 47 | 9.5 | 603.0 | 29.3 | 96 | 17668 | 57888 | Example |
| 33 | 36 | 10.1 | 637.0 | 29.4 | 93 | 18728 | 59241 | Example |

TABLE 2-continued

| | | | | | | | |
|---|---|---|---|---|---|---|---|
| 34 | 61 | 8.9 | 610.0 | 29.2 | 113 | 17812 | 68930 | Example |
| 35 | 48 | 10.3 | 611.0 | 32.5 | 86 | 19858 | 52546 | Example |
| 36 | 46 | 9.5 | 627.0 | 31.5 | 87 | 19751 | 54549 | Example |
| 37 | 48 | 6.5 | 605.2 | 30.8 | 93 | 18640 | 58284 | Comparative example*1 |
| 38 | 47 | 15.9 | 599.5 | 30.5 | 102 | 18285 | 61149 | Comparative example*2 |

Underlined value: outside the scope of this disclosure
*1Poor appearance coating
*2Poor coating adhesion

Example 2

Steel slabs prepared from steels having chemical compositions of steel type C, E, and H shown in Table 1 were hot-rolled, followed by pickling. Each hot-rolled steel was then cold-rolled into a 1.2 mm thick cold-rolled steel sheet. Then, continuous annealing was performed in a continuous galvanizing line including a DFF (direct fired furnace) under the annealing conditions (DFF temperature, annealing temperature, temperature at which cooling is suspended) shown in Table 3. Subsequently, galvanization was performed in a galvanization hot dip zinc pot of 463° C. so as to form a coating of about 40 to 60 g/m² for each surface, followed by galvannealing. The resulting steel sheet was 0.3% temper-rolled. The gas air ratio in the DFF in the stage of heating was controlled to 1.0 to 1.2 upstream, and to 0.9 downstream.

The resulting galvanized steel sheet was evaluated for the microstructure and it hardness, mechanical properties (strength, elongation, stretch flangeability) in the same manner as in Example 1.

The number density (number/μm²) of secondary phases (martensite or carbide) existing in the inner ferrite grains was determined by measuring the number of the secondary phases in 3000 μm² from an SEM photograph taken at a magnification of ×1500. The martensite grain diameter ($d_M$) and the martensite average grain spacing ($L_M$) were measured using image analysis software Image-Pro produced by Media Cybernetics. The martensite grain size was measured as a diameter. The martensite average grain spacing was calculated from the following equation (1):

$$L_M = d_M/2 \times (4\pi/3f)^{1/3} \quad (1)$$

where $d_M$: martensite grain diameter;
f: volume fraction (=martensite area ratio); and
π: circular constant.

Table 3 shows the evaluation results together.

In Specimen No. 39, the number of secondary phases existing in the inner ferrite grains was as very low as $0.2 \times 10^{-3}$ per μm² due to a low annealing temperature of 795° C., and thus, the hole expanding ratio was as low as 77%. In Specimen No. 40, on the other hand, the number of secondary phases existing in the inner ferrite grains was as high as $2.4 \times 10^{-3}$ per μm² and larger than that of No. 39 due to a high annealing temperature of 845° C., and thus, a hole expanding ratio of 90% was ensured. In Specimen No. 41, the number of secondary phases existing in the inner ferrite grains was as high as $6.3 \times 10^{-3}$ per μm² due to a high annealing temperature of 890° C., and thus, a further hole expanding ratio of 106% was ensured.

In Specimen No. 42, martensite exhibited a large maximum grain diameter of 5.2 μm and a small average grain spacing of 1.7 μm due to a high temperature of 600° C. at which cooling was suspended, and thus, the hole expanding ratio was as low as 71%. In Specimen No. 43, on the other hand, martensite exhibited a small maximum grain diameter of 3.8 μm and a large average grain spacing of 2.9 μm due to a low temperature of 520° C. at which cooling was suspended, and thus, a hole expanding ratio of 82% was ensured. In Specimen No. 44, a much superior hole expanding ratio was ensured because of a still lower temperature at which cooling was suspended.

In Specimen No. 45, martensite exhibited a small average grain spacing of 1.8 μm due to a low sheet temperature of 620° C. in DFF, and thus, the hole expanding ratio was as low as 51%. In Specimen No. 46, on the other hand, martensite exhibited a large average grain spacing because of a high sheet temperature of 760° C. in DFF, and thus, a superior hole expanding ratio was ensured.

TABLE 3

| No. | Steel type | DFF discharging side temperature (° C.) | Annealing temperature (° C.) | Cooling suspended temperature (° C.) | Vα (%) | VM (%) | HVα | Maximum $d_M$ (μm) | $L_M$ (μm) | Secondary phases isolated among the ferrite grains (×10⁻³/μm²) | Ratio of the length of grain boundary from which inclusion is precipitated to the entire length of grain boundary (%) | Average length of inclusion along grain boundary (mm) |
|---|---|---|---|---|---|---|---|---|---|---|---|---|
| 39 | C | 750 | 795 | 550 | 94.4 | 5.6 | 156.3 | 4.0 | 2.7 | 0.2 | 31 | 0.19 |
| 40 | C | 755 | 845 | 555 | 93.5 | 6.5 | 172.5 | 3.8 | 3.2 | 2.4 | 28 | 0.20 |
| 41 | C | 760 | 890 | 550 | 95.3 | 4.7 | 181.6 | 2.6 | 3.9 | 6.3 | 32 | 0.22 |
| 42 | E | 745 | 855 | 600 | 92.4 | 7.6 | 177.2 | 5.2 | 1.7 | 1.9 | 19 | 0.24 |
| 43 | E | 755 | 850 | 520 | 93.9 | 6.1 | 176.8 | 3.8 | 2.9 | 2.2 | 26 | 0.22 |
| 44 | E | 750 | 845 | 480 | 94.8 | 5.2 | 179.8 | 2.7 | 3.6 | 2.6 | 22 | 0.26 |
| 45 | H | 620 | 865 | 560 | 90.9 | 9.1 | 172.5 | 4.8 | 1.8 | 3.0 | 35 | 0.29 |
| 46 | H | 760 | 870 | 555 | 91.5 | 8.5 | 175.3 | 3.9 | 2.8 | 2.9 | 38 | 0.27 |

TABLE 3-continued

| No. | Steel type | Coating type | Amount of coating (g/m²) | Fe (mass %) in coating layer (g/m²) | TS (MPa) | El (%) | λ (%) | TS × El | TS × λ | Remark |
|---|---|---|---|---|---|---|---|---|---|---|
| 39 | C | GA | 55 | 9.8 | 598.5 | 31.8 | 77 | 19032 | 46085 | Example |
| 40 | C | GI | 58 | — | 606.3 | 32.1 | 90 | 19462 | 54567 | Example |
| 41 | C | GI | 61 | — | 601.1 | 33.3 | 106 | 20017 | 63717 | Example |
| 42 | E | GA | 55 | 9.7 | 660.1 | 30.1 | 71 | 19869 | 46867 | Example |
| 43 | E | GA | 58 | 9.5 | 651.6 | 31.4 | 82 | 20460 | 53431 | Example |
| 44 | E | GA | 49 | 10.2 | 643.5 | 32.5 | 88 | 20914 | 56628 | Example |
| 45 | H | GI | 46 | — | 671.6 | 30.3 | 51 | 20349 | 34252 | Example |
| 46 | H | GA | 48 | 9.7 | 668.4 | 30.8 | 70 | 20587 | 46788 | Example |

The invention claimed is:

1. A high-strength galvanized steel sheet comprising a base steel and a galvanized coating layer formed over a surface of the base steel, the base steel having a chemical composition containing on a mass basis:
0.005% to 0.12% of C;
more than 1.0% to 2.7% of Si;
0.5% to 2.8% of Mn;
0.1% or less of P;
0.07% or less of S;
1.0% or less of Al;
0.008% or less of N; and
the balance being Fe and inevitable impurities, and a microstructure constituted of at least 90% of ferrite and 2% to 10% of martensite on an area basis, wherein the ferrite has a Vickers hardness of 120 or more on average, and an inclusion is precipitated from a grain boundary with a length of 50% or less relative to an entire length of the grain boundary in a surface layer of the base steel with a depth of 3 μm from an interface between the coating layer and the base steel.

2. The high-strength galvanized steel sheet according to claim 1, wherein the chemical composition further contains at least one selected from the group consisting of:
0.01% to 0.1% of Ti;
0.01% to 0.1% of Nb;
0.0003% to 0.0050% of B;
0.05% to 2.0% of Ni; and
0.05% to 2.0% of Cu on a mass basis.

3. The high-strength galvanized steel sheet according to claim 1, wherein the chemical composition further contains at least one of:
0.001% to 0.005% of Ca; and
0.001% to 0.005% of rare earth metal (REM) on a mass basis.

4. The high-strength galvanized steel sheet according to claim 1, wherein the iron content in the coating layer is in the range of 7% to 15% by mass.

5. The high-strength galvanized steel sheet according to claim 1, wherein the martensite has a grain diameter of 5 μm or less, and an average grain spacing of 2 μm or more.

6. The high-strength galvanized steel sheet according to claim 2, wherein the microstructure includes at least $3.3 \times 10^{-3}$ secondary phases per μm² in the inner ferrite grains.

7. The high-strength galvanized steel sheet according to claim 5, wherein an inclusion precipitated at the grain boundary in the surface layer of the base steel has a length of 0.3 μm or less on average along the grain boundary.

8. The high-strength galvanized steel sheet according to claim 5, wherein the chemical composition further contains at least one selected from the group consisting of:
0.05% to 1.2% of Cr;
0.005% to 1.0% of V; and
0.005% to 0.5% of Mo on a mass basis.

9. The high-strength galvanized steel sheet according to claim 5, wherein the chemical composition further contains at least one selected from the group consisting of:
0.01% to 0.1% of Ti;
0.01% to 0.1% of Nb;
0.0003% to 0.0050% of B;
0.05% to 2.0% of Ni; and
0.05% to 2.0% of Cu on a mass basis.

10. The high-strength galvanized steel sheet according to claim 5, wherein the chemical composition further contains at least one of:
0.001% to 0.005% of Ca; and
0.001% to 0.005% of rare earth metal (REM) on a mass basis.

11. The high-strength galvanized steel sheet according to claim 1, wherein the microstructure includes at least $3.3 \times 10^{-3}$ secondary phases per μm² in the inner ferrite grains.

12. The high-strength galvanized steel sheet according to claim 11, wherein an inclusion precipitated at the grain boundary in the surface layer of the base steel has a length of 0.3 μm or less on average along the grain boundary.

13. The high-strength galvanized steel sheet according to claim 11, wherein the chemical composition further contains at least one selected from the group consisting of:
0.05% to 1.2% of Cr;
0.005% to 1.0% of V; and
0.005% to 0.5% of Mo on a mass basis.

14. The high-strength galvanized steel sheet according to claim 11, wherein the chemical composition further contains at least one selected from the group consisting of:
0.01% to 0.1% of Ti;
0.01% to 0.1% of Nb;
0.0003% to 0.0050% of B;
0.05% to 2.0% of Ni; and
0.05% to 2.0% of Cu on a mass basis.

15. The high-strength galvanized steel sheet according to claim 11, wherein the chemical composition further contains at least one of:
0.001% to 0.005% of Ca; and
0.001% to 0.005% of rare earth metal (REM) on a mass basis.

16. The high-strength galvanized steel sheet according to claim 1, wherein an inclusion precipitated at the grain boundary in the surface layer of the base steel has a length of 0.3 μm or less on average along the grain boundary.

17. The high-strength galvanized steel sheet according to claim 16, wherein the chemical composition further contains at least one selected from the group consisting of:
0.05% to 1.2% of Cr;
0.005% to 1.0% of V; and
0.005% to 0.5% of Mo on a mass basis.

18. The high-strength galvanized steel sheet according to claim 16, wherein the chemical composition further contains at least one selected from the group consisting of:
0.01% to 0.1% of Ti;
0.01% to 0.1% of Nb;
0.0003% to 0.0050% of B;
0.05% to 2.0% of Ni; and
0.05% to 2.0% of Cu on a mass basis.

19. The high-strength galvanized steel sheet according to claim 1, wherein the chemical composition further contains at least one selected from the group consisting of:
0.05% to 1.2% of Cr;
0.005% to 1.0% of V; and
0.005% to 0.5% of Mo on a mass basis.

20. The high-strength galvanized steel sheet according to claim 19, wherein the chemical composition further contains at least one selected from the group consisting of:
0.01% to 0.1% of Ti;
0.01% to 0.1% of Nb;
0.0003% to 0.0050% of B;
0.05% to 2.0% of Ni; and
0.05% to 2.0% of Cu on a mass basis.

* * * * *